United States Patent
Kawashima et al.

(10) Patent No.: US 9,931,914 B2
(45) Date of Patent: Apr. 3, 2018

(54) BONDING STRUCTURE OF VEHICLE MEMBERS AND BONDING STRUCTURE OF BACKDOOR

(71) Applicant: TOYOTA JIDOSHA KABUSHIKI KAISHA, Toyota-shi, Aichi-ken (JP)

(72) Inventors: Mutsumi Kawashima, Nisshin (JP); Miho Mizukoshi, Obu (JP); Yasuyuki Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/103,012

(22) PCT Filed: Dec. 12, 2014

(86) PCT No.: PCT/IB2014/002757
§ 371 (c)(1),
(2) Date: Jun. 9, 2016

(87) PCT Pub. No.: WO2015/092513
PCT Pub. Date: Jun. 25, 2015

(65) Prior Publication Data
US 2016/0375747 A1  Dec. 29, 2016

(30) Foreign Application Priority Data

Dec. 18, 2013  (JP) .................................. 2013-261489

(51) Int. Cl.
*B62D 25/00* (2006.01)
*B60J 5/10* (2006.01)
(Continued)

(52) U.S. Cl.
CPC ............... *B60J 5/107* (2013.01); *B60J 5/101* (2013.01); *B60R 13/105* (2013.01); *B62D 29/048* (2013.01); *B62D 29/005* (2013.01)

(58) Field of Classification Search
CPC ......... B60J 5/101; B60J 5/107; B60R 13/105; B62D 29/005; B62D 29/048
(Continued)

(56) References Cited

U.S. PATENT DOCUMENTS 4,822,098 A * 4/1989 Vogt .......................... B60J 5/101
296/146.5
8,226,151 B2 * 7/2012 Miyake .................... B60J 5/101
296/106

(Continued)

FOREIGN PATENT DOCUMENTS

EP  2653331 A1  10/2013
JP  2007-245759 A  9/2007
(Continued)

*Primary Examiner* — Jerry E Redman
(74) *Attorney, Agent, or Firm* — Oliff PLC

(57) ABSTRACT

A bonding structure of vehicle members includes a first member formed of resin in a shape of a panel and in which a ridge line is formed by an angular portion divided with respect to a curvature of other portion of a surface thereof, a second member formed in a shape of a panel with resin or metal having a smaller thermal expansion coefficient than the first member, an outside bonding portion provided on an outer edge side of the first member to bond together the first member and the second member, and an inside bonding portion provided inside of the outside bonding portion in a plane direction of the first member and bonds together the first member and the second member, at least one of plural apexes in a proximity of the outside bonding portion overlapping the ridge line when viewed from outside of the vehicle.

11 Claims, 11 Drawing Sheets

(51) Int. Cl.
  *B60R 13/10* (2006.01)
  *B62D 29/04* (2006.01)
  *B62D 29/00* (2006.01)

(58) Field of Classification Search
  USPC .......................................................... 296/56
  See application file for complete search history.

(56) References Cited

U.S. PATENT DOCUMENTS

| | | | | |
|---|---|---|---|---|
| 8,567,841 | B2* | 10/2013 | Ginestet | B60J 5/107 296/146.8 |
| 8,690,220 | B2* | 4/2014 | Tsukiyama | B60J 5/101 296/106 |
| 9,469,180 | B2* | 10/2016 | Kamimura | B60J 5/107 |
| 9,499,032 | B2* | 11/2016 | Ikeda | B60J 5/101 |
| 9,623,731 | B2* | 4/2017 | Ikeda | B60J 5/10 |
| 9,649,917 | B2* | 5/2017 | Ikeda | B60J 5/102 |
| 2012/0280533 | A1* | 11/2012 | Gachter | B60J 5/107 296/146.8 |
| 2013/0280452 | A1* | 10/2013 | Nawroth | B60J 5/107 428/35.7 |
| 2014/0167446 | A1* | 6/2014 | Iwano | B60J 5/106 296/146.8 |
| 2015/0210147 | A1* | 7/2015 | Kodama | B60J 5/107 296/146.6 |

FOREIGN PATENT DOCUMENTS

| | | |
|---|---|---|
| JP | 2009-173086 A | 8/2009 |
| JP | 2009-196435 A | 9/2009 |
| JP | 2012-061957 A | 3/2012 |
| JP | 2012-121356 A | 6/2012 |
| JP | 2013-141877 A | 7/2013 |
| JP | 2013-220751 A | 10/2013 |
| WO | 2013/018470 A1 | 2/2013 |
| WO | WO 2014061268 A1 * | 4/2014 ................ B60J 5/10 |

* cited by examiner

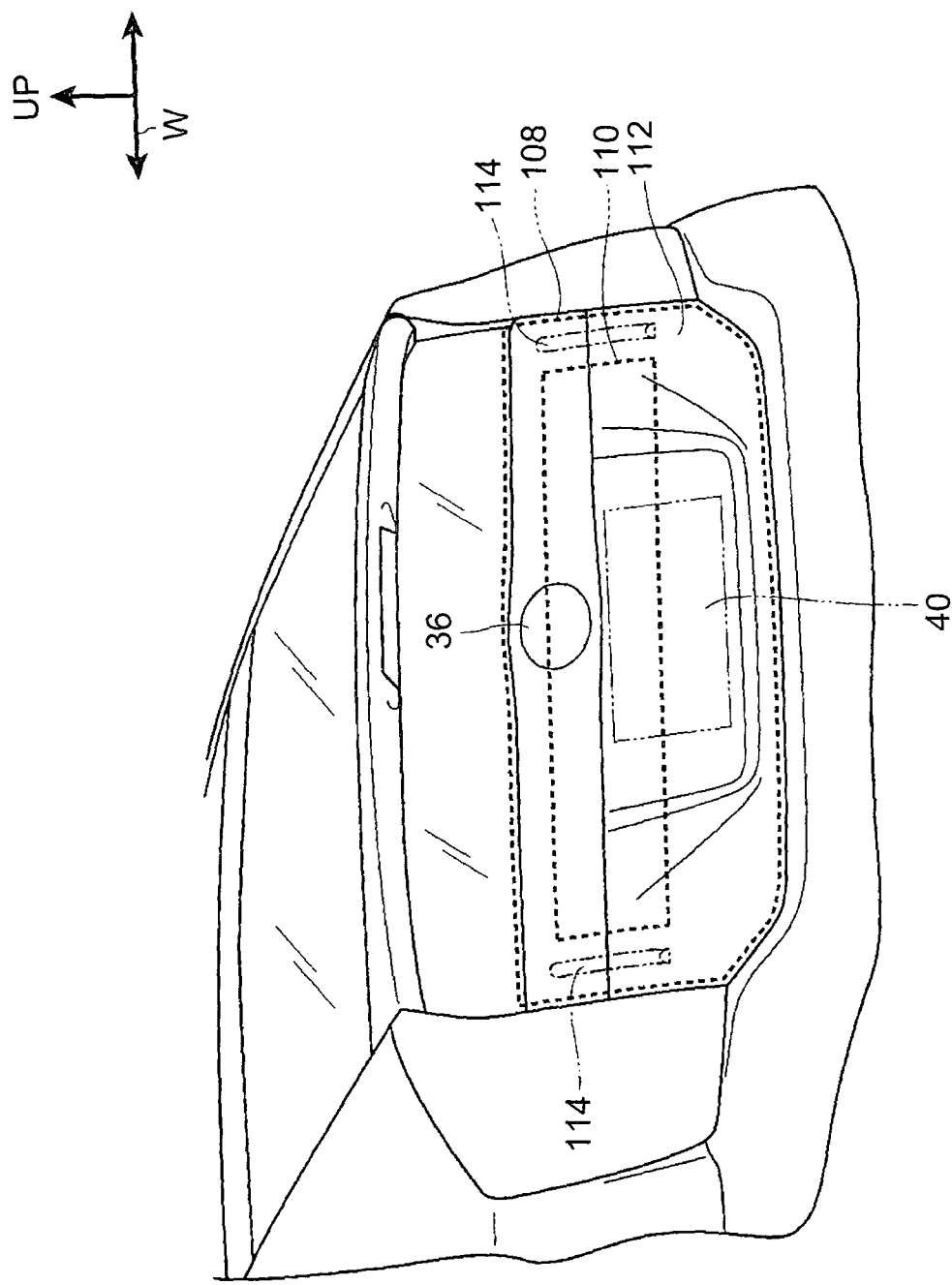

BONDING STRUCTURE OF VEHICLE MEMBERS AND BONDING STRUCTURE OF BACKDOOR

BACKGROUND OF THE INVENTION

1. Field of the Invention

The present invention relates to a bonding structure of vehicle members and a bonding structure of a back door.

2. Description of Related Art

Japanese Patent Application Publication No. 2007-245759 (JP 2007-245759 A) has disclosed a technology of bonding outer edge portions of an inner panel made of resin and an outer panel made of resin together with adhesive. Further, according to Japanese Patent Application Publication No. 2009-173086 (JP 2009-173086 A), a recessed groove is provided on the outer edge portion of any one of the inner panel made of resin and the outer panel made of resin. A technology of filling the inside of the recessed groove with adhesive and bonding the inner panel and the outer panel together via the adhesive has been disclosed.

However, in these related arts, it has been described only that the outer panel (first member) and the inner panel (second member) are made of resin. Thus, if materials each having a different thermal expansion coefficient are used for the outer panel and the inner panel, when these panels are bonded together, thermal strain may be generated on a panel side having a larger thermal expansion coefficient.

SUMMARY OF THE INVENTION

The present invention provides a bonding structure of vehicle members and a bonding structure of a back door capable of inhibiting thermal strain which is generated on a member side having a larger thermal expansion coefficient even when members each having a different thermal expansion coefficient are bonded together.

A first aspect of the present invention relates to a bonding structure of vehicle members. The bonding structure of vehicle members includes: a first member which is formed of resin in the shape of a panel and in which a ridge line is formed with an angular portion divided with respect to the curvature of other portion of the surface thereof; a second member which is formed in the shape of a panel of resin or metal having a smaller thermal expansion coefficient than the first member; an outside bonding portion which is provided on an outer edge side of the first member so as to bond the first member and the second member to each other; and an inside bonding portion which is provided inside of the outside bonding portion in a plane direction of the first member and bonds the first member and the second member to each other, at least one of plural apexes in the proximity of the outside bonding portion overlapping the ridge line when viewed from outside of the vehicle.

According to the above-described aspect, the ridge line is formed on the surface of the panel-like first member formed of resin by the angular portion divided with respect to the curvature of other portion of the surface thereof. The panel-like second member formed of resin or metal having a smaller thermal expansion coefficient than the first member and the first member are bonded to each other via the outside bonding portion and the inside bonding portion.

The outside bonding portion is provided on the outer edge side of the first member and the inside bonding portion is provided inside of the outside bonding portion in a plane direction of the first member. Here, at least one apex of plural apexes in the proximity of the outside bonding portion in the inside bonding portion is set so as to overlap the ridge line formed on the surface of the first member when viewed from outside of the vehicle.

Generally, on a design surface of a vehicle, even curved surfaces each having a different curvature are formed to be continuous to each other to form a smooth curved surface (so-called general surface). The angular portion (so-called character line and the like) formed so as to divide such a smooth curved surface has a higher stiffness than the general portion (portion where the general surface is formed). Thus, the stiffness of the first member can be improved by forming the ridge line originating from the angular portion on the first member. As a result, thermal strain can be inhibited on the first member.

At the apex in the proximity of the outside bonding portion in the inside bonding portion, thermal strains in different directions are compounded so that any deformed portion due to the thermal strain is more noticeable than other portions. Thus, by setting the apex so as to overlap a ridge line formed on the first member when viewed from outside of the vehicle, the deformed portion due to the thermal strain can be made unnoticeable.

As described above, the bonding structure of vehicle members according to the first aspect of the present invention has an excellent effect of being capable of inhibiting thermal strain which is generated on a member side having a larger thermal expansion coefficient even when members each having a different thermal expansion coefficient are bonded together.

In the above-described aspect, the inside bonding portion may include a plurality of linear or curved bonding lines and the apex may be a connecting portion for connecting the bonding lines to each other.

In the above-described aspect, the inside bonding portion includes a plurality of linear or curved bonding lines. That is, there are cases where the inside bonding portion is constituted of a plurality of linear bonding lines, where it is constituted of a plurality of curved bonding lines and where it is constituted of linear bonding lines and curved bonding lines. Then, compared to a case where the inside bonding portion is formed intermittently with a plurality of bonding portions, bonding strength between the first member and the second member can be improved by this bonding line.

Further, the apex in the proximity of the outside bonding portion is a connecting portion for connecting the bonding lines to each other. At the connecting portion where a plurality of the bonding lines are connected to each other, thermal strains in different directions are compounded so that any deformed portion due to the thermal strain is more noticeable than other portions. Thus, by setting the connecting portion to overlap the ridge line formed on the first member when viewed from outside of the vehicle, the deformed portion due to the thermal strain can be made unnoticeable.

The bonding structure of vehicle members according to the above-described aspect has an excellent effect of being capable of improving bonding strength between the first member and the second member compared to a case where the inside bonding portion is formed intermittently with a plurality of the bonding portions.

In the above-described aspect, the bonding lines may be provided in a direction intersecting with the outside bonding portion in the plane direction of the first member.

For example, in a case where thermal strain is generated in the first member, the thermal strain is generated between the outside bonding portion and the inside bonding portion because the first member is restrained by the outside bonding portion and the inside bonding portion. Thus, if the outside bonding portion and the inside bonding portion are arranged in parallel to each other in the plane direction of the first member, deformed portions due to thermal strain are formed continuously by a substantially equivalent strain amount along the outside bonding portion and the inside bonding portion between the outside bonding portion and the inside bonding portion. Consequently, the deformed portion due to the thermal strain is noticeable.

Thus, in the above-described aspect, the bonding lines are provided in a direction intersecting with the outside bonding portion in the plane direction of the first member. As a result, if a sectional position which is presented when cutting out the first member in a direction perpendicular to the outside bonding portion is changed, a distance between the outside bonding portion and the inside bonding portion differs. That is, a strain amount due to thermal strain generated between the outside bonding portion and the inside bonding portion can be changed depending on the sectional position of the first member.

The bonding structure of vehicle members according to the above-described aspect has an excellent effect of being capable of making a deformed portion due to thermal strain unnoticeable by changing the strain amount due to thermal strain generated between the outside bonding portion and the inside bonding portion depending on the sectional position of the first member.

In the above-described aspect, the ridge line may be provided between the outside bonding portion and the inside bonding portion when viewed from outside of the vehicle and the inside bonding portion may be formed along the ridge line.

If thermal strain is generated in the first member, the thermal strain is generated between the outside bonding portion and the inside bonding portion. Thus, in the above-described aspect, the ridge line is provided between the outside bonding portion and the inside bonding portion when viewed from outside of the vehicle and the inside bonding portion is formed along the ridge line. As a result, the deformed portion due to thermal strain can be made unnoticeable.

The bonding structure of a back door according to the above-described aspect has an excellent effect of being capable of making the deformed portion unnoticeable by overlapping the deformed portion due to the thermal strain with the character line in a vehicle rear view.

In the above-described aspect, the inside bonding portion may be formed in a polygonal shape.

In the above-described aspect, the inside bonding portion is formed in the polygonal shape and it can be changed freely corresponding to the shape of the ridge line.

The bonding structure of vehicle members according to the above-described aspect has an excellent effect of being capable of making the deformed portion unnoticeable by overlapping the deformed portion due to the thermal strain with the character line in a vehicle rear view by controlling a range where the thermal strain is generated easily.

In the above-described aspect, the bonding lines may constitute a curved line and the curved lines may be formed such that they are recessed in a direction away from the outside bonding portion.

Because in the above-described aspect, the curved line is formed such that it is recessed in a direction away from the outside bonding portion, the distance between the curved line and the outside bonding portion increases. As a result, the strain amount due to the thermal strain can be reduced.

The bonding structure of vehicle members according to the above-described aspect has an excellent effect of being capable of reducing the strain amount due to the thermal strain by forming the curved line so that the distance between the curved line and the outside bonding portion increases.

In the above-described aspect, the bonding lines may constitute a curved line, and the curved lines may be formed such that they are expanded in a direction of approaching the outside bonding portion side.

In the above-described aspect, the curved lines are formed such that they are expanded in the direction of approaching the outside bonding portion side, so that a range where the inside bonding portion is provided can be increased. As a result, bonding strength between the first member and the second member can be improved.

The bonding structure of vehicle members according to the above-described aspect has an excellent effect of being capable of improving the bonding strength between the first member and the second member by increasing the range where the inside bonding portion is provided.

In the above-described aspect, the inside bonding portion may be formed such that end portions of the first curved line which is expanded to the outside bonding portion side and a second curved line which is expanded in a direction away from the first curved line are connected to each other via the connecting portion.

In the above-described aspect, the inside bonding portion is formed such that the first curved line and the second curved line are expanded in the direction away from each other. As a result, the length of the bonding portion can be increased compared to a case where the inside bonding portion is formed linearly in a diamond shape and thereby the bonding strength between the first member and the second member can be improved.

The bonding structure of vehicle members according to the above-described aspect has an excellent effect of being capable of increasing the length of the bonding portion compared to a case where the inside bonding portion is formed linearly in the diamond shape and improving the bonding strength between the first member and the second member.

In the above-described aspect, of the apexes, other first apex may be provided at a position where the apex overlaps a license plate when viewed from outside of a vehicle.

At the apex in the proximity of the outside bonding portion in the inside bonding portion, the deformed portion due to the thermal strain is more noticeable than other portions. Thus, in the above-described aspect, the other first apex than the apexes which overlap the ridge line when viewed from outside of the vehicle is set to overlap the license plate when viewed from outside of the vehicle and thereby the deformed portion due to the thermal strain can be hidden.

The bonding structure of vehicle members according to the above-described aspect has an excellent effect of being capable of hiding the deformed portion due to the thermal strain with the license plate.

In the above-described aspect, of the apexes, other second apex may be provided at a position where the apex overlaps an emblem when viewed from outside of the vehicle.

At the apex in the proximity of the outside bonding portion in the inside bonding portion, the deformed portion due to the thermal strain is more noticeable than other portions. Thus, in the above-described aspect, the other second apex than the apexes which overlap the ridge line when viewed from outside of the vehicle is set to overlap the emblem when viewed from outside of the vehicle and thereby the deformed portion due to the thermal strain can be hidden.

The bonding structure of vehicle members according to the above-described aspect has an excellent effect of being capable of hiding the deformed portion due to the thermal strain with the emblem.

A second aspect of the present invention relates to a bonding structure of a back door. The bonding structure of a back door includes: a door outer panel which constitutes an outer panel of a back door; and a door inner panel which is arranged on a vehicle compartment side of the door outer panel and constitutes an inner panel of the back door. The door outer panel is a first member according to any one of the above-described aspect and the door inner panel is a second member according to any one of the above-described aspect.

The bonding structure of a back door according to the second aspect of the present invention has an excellent effect of being capable of reducing manufacturing cost because at least a door outer panel of the back door is formed of resin.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is an enlarged view corresponding to FIG. 3 showing the comparative example.

DETAILED DESCRIPTION OF EMBODIMENTS

Hereinafter, an embodiment of a bonding structure of vehicle members according to the embodiment of the present invention will be described with reference to the drawings. In the meantime, in these drawings, an arrow FR described appropriately indicates forward of a vehicle, an arrow UP indicates upward of the vehicle, an arrow W indicates a vehicle width direction and an arrow OUT indicates outward of the vehicle, respectively.

(Composition of Bonding Structure of Vehicle Members)

Figure 1:
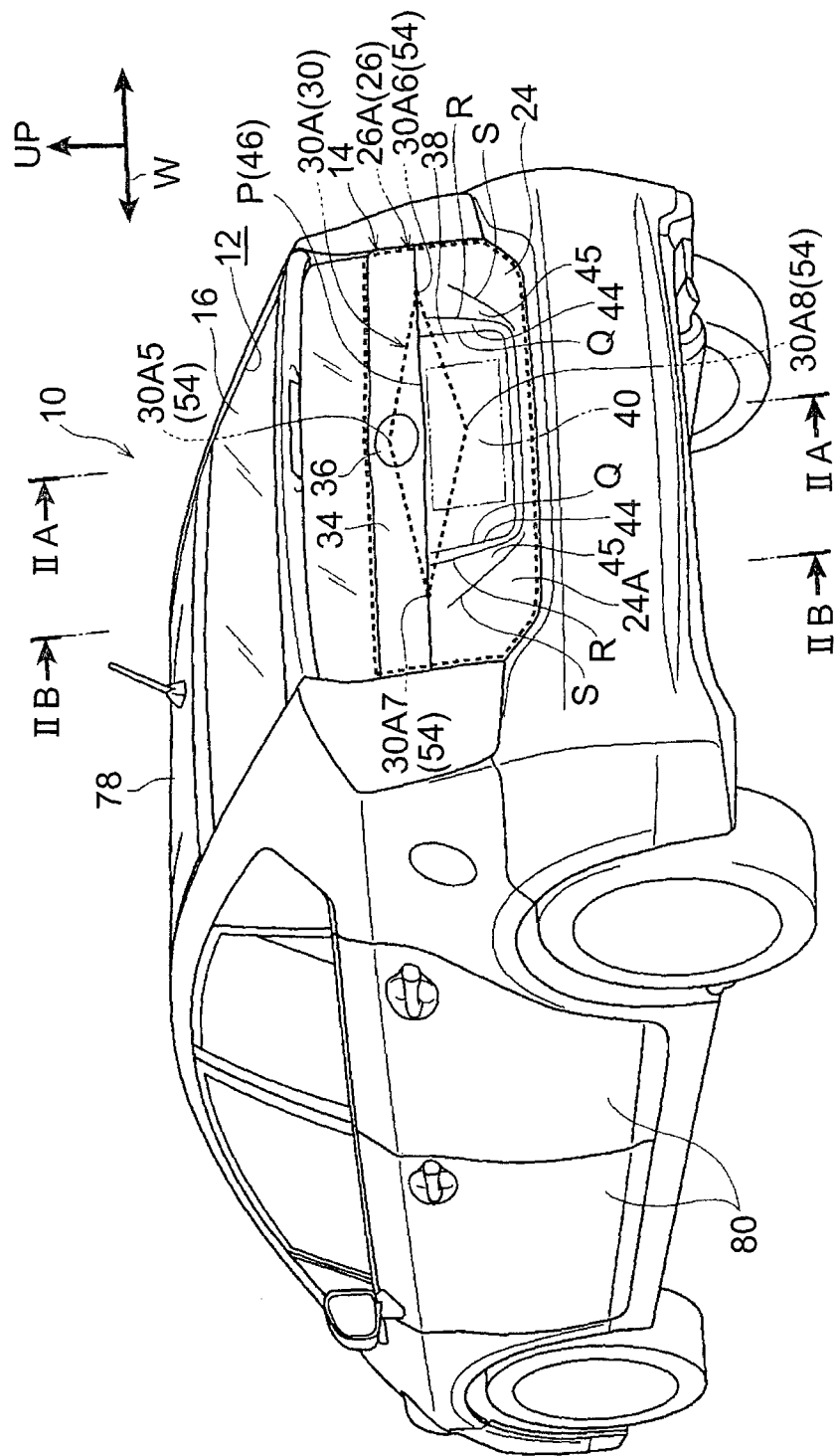
FIG. 1 is a perspective view taken from an obliquely backward left side of a vehicle having a back door on which a bonding structure of vehicle members according to the present embodiment is applied.

FIG. 1 shows a perspective view taken from an obliquely backward left side of a vehicle having a back door on which the bonding structure of vehicle members according to the present embodiment is applied. As shown in FIG. 1, a door opening portion 12 is formed at the rear end portion of a vehicle 10 and a door hinge (not shown) is provided at an upper edge portion of the door opening portion 12. The back door 14 to which the bonding structure of vehicle members is applied is supported rotatably by this door hinge so that the door opening portion 12 can be opened/closed by means of the back door 14. In the meantime, a back door glass 16 is attached to the top portion of the back door 14.

Figure 2A:
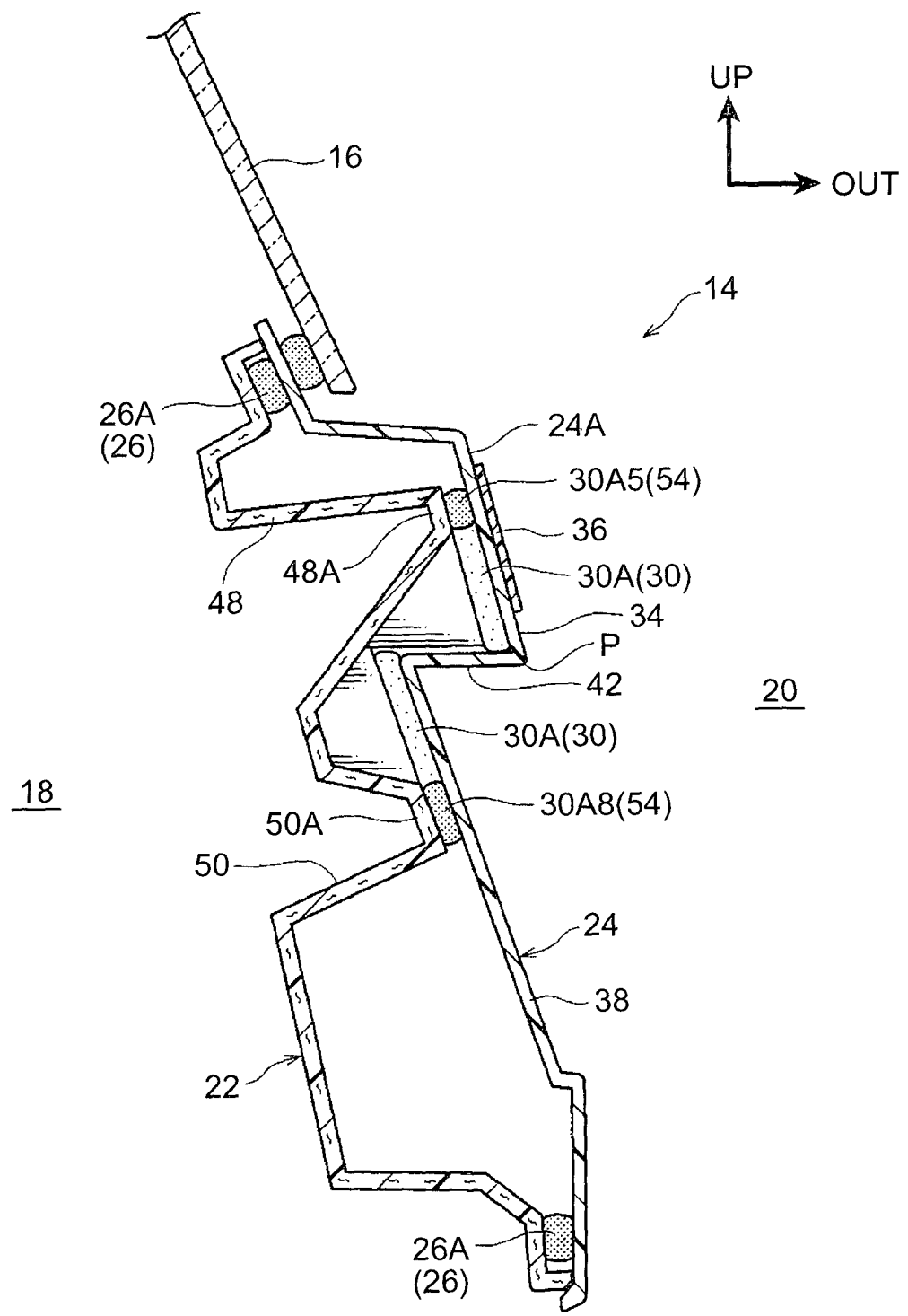
FIG. 2A is a longitudinal sectional view taken when the back door is cut out along the line IIA-IIA in FIG. 1.
Figure 2B:
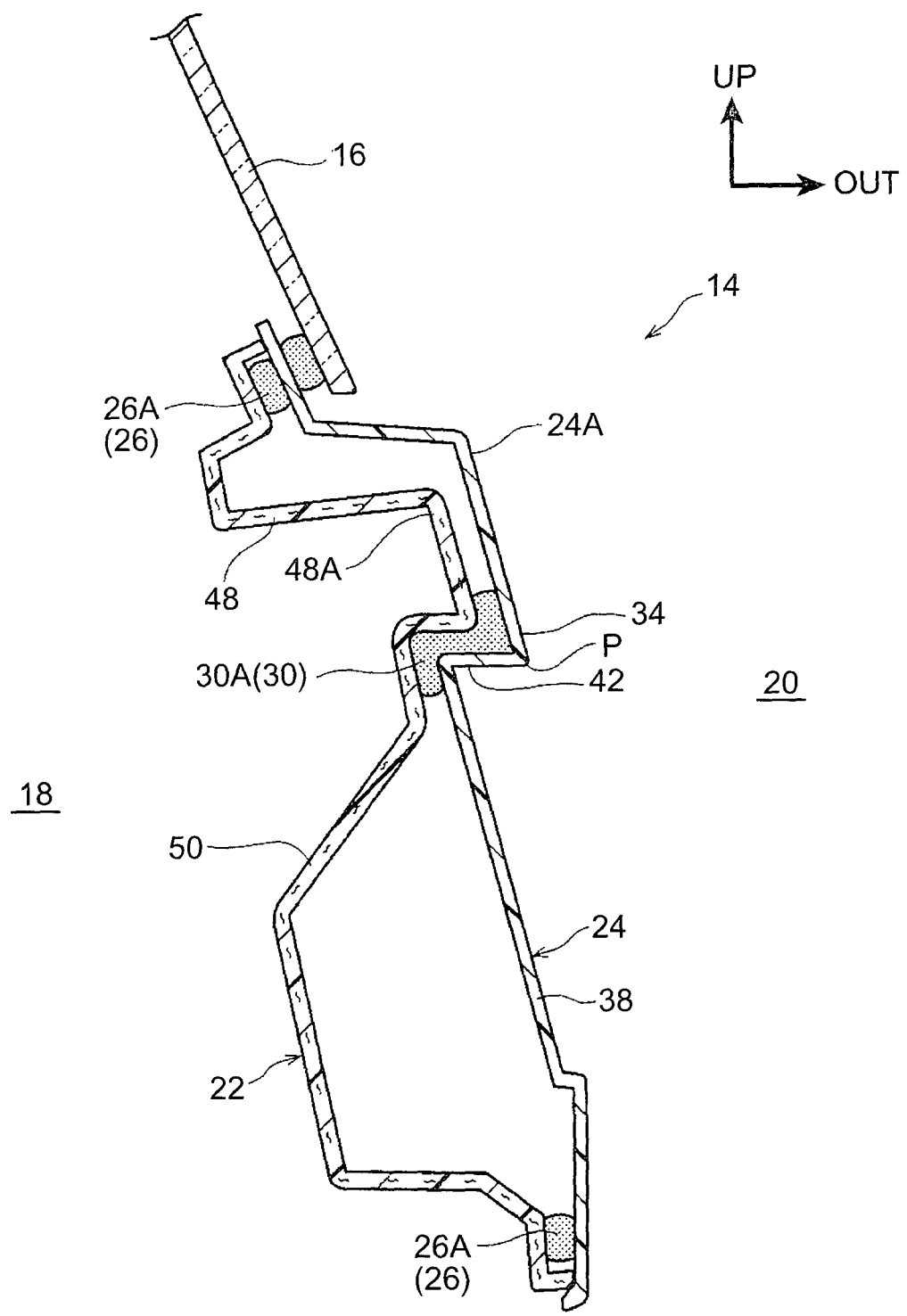
FIG. 2B is a longitudinal sectional view taken when the back door is cut out along the line IIB-IIB in FIG. 1.

FIG. 2A shows a state in which the back door 14 is cut out along the up-down direction of the vehicle (line IIA-IIA in FIG. 1) in the center of a bottom portion thereof. FIG. 2B shows a state in which the back door 14 is cut out along the up-down direction of the vehicle (line IIB-IIB in FIG. 1) on the left side at a bottom portion thereof in the vehicle width direction. As shown in FIGS. 2A and 2B, the back door 14 includes a door outer panel 24 which is arranged on the vehicle outside 20 side of a door inner panel 22 and constitutes an outside panel of the back door 14 as a first member and the door inner panel 22 which is arranged on the inside of a vehicle compartment 18 and constitutes an inside panel of the back door 14 as a second member.

The door inner panel 22 is formed of fiber-reinforced resin such as carbon-fiber-reinforced plastic (CFRP). On the other hand, the door outer panel 24 is formed of a material having a larger thermal expansion coefficient than the fiber-reinforced resin. For example, TSOP (Toyota Super Olefin Polymer (trade mark): thermoplastic resin composed of mainly PP and EPDM) and the like can be picked up as an example. Then, in the present embodiment, for example, a material having a linear expansion coefficient of $0.5 \times 10^{-5}$ m/° C. is used for the door inner panel 22 and a material having a liner expansion coefficient of $6.0 \times 10^{-5}$ m/° C. is used for the door outer panel 24.

Although, not shown, the door inner panel 22 is formed in a substantially rectangular shape, for example, in the vehicle rear view. The door outer panel 24 is formed, in a substantially rectangular shape in the vehicle rear view so as to cover the surface of the door inner panel 22 and the door outer panel 24 is bonded (fixed) to the door inner panel 22.

More specifically, an outside bonding portion 26 is provided on the outer edge portion of the door outer panel 24 and an inside bonding portion 30 is provided inside of the outside bonding portion 26 in a plane direction of the door outer panel 24. Then, the door inner panel 22 and the door outer panel 24 are configured to be bonded to each other via adhesive 26A which constitutes the outside bonding portion 26 and adhesive 30A which constitutes the inside bounding portion 30.

In the meantime, although application surfaces of the outside bonding portion 26 and the inside bonding portion 30 are flat, the present invention is not limited to this example. For example, it is permissible to form a groove portion in the application surfaces of the outside bonding portion 26 and the inside bonding portion 30 in the door inner panel 22 or door outer panel 24. However, in this case, considering from design viewpoints, the groove portion is more preferred to be formed on the door inner panel 22 side.

A pedestal 34 projecting backward in the vehicle front-rear direction is formed throughout an entire range of the door outer panel 24 in the vehicle width direction on a bottom side of the back door glass 16. Then, an emblem 36 is provided on a central portion of the pedestal 34 in the vehicle width direction. A license plate mounting portion 38 which is recessed forward in the vehicle front-rear direction from a general surface 24A of the door outer panel 24 and forms a substantially rectangular bearing surface in the vehicle rear view is provided below this emblem 36. A license plate 40 (see FIG. 1) indicated with a phantom line is to be mounted on this license plate mounting portion 38.

Here, a curved surface of the license plate mounting portion 38 in the door outer panel 24 is not continuous to a curved surface of the general surface 24A and divided by a lengthwise wall 42 which acts as an angular portion projecting to the front side with respect to the general surface 24A in the vehicle front-rear direction. As a result, a ridge line P is formed on a boundary portion between the license plate mounting portion 38 and the general surface 24A in the vehicle rear view.

In the meantime, as shown in FIG. 1, inclined walls 44, 45 which are inclined toward the rear side in the vehicle front-rear direction as they go outward in the vehicle width direction are formed on both end portions of the license plate mounting portion 38 in the vehicle width direction such that their inclination angles are different from each other. Thus, a ridge line Q is formed on a boundary portion between the license plate mounting portion 38 and the inclined wall 44 and a ridge line R is formed on a boundary portion between the inclined wall 44 and the inclined wall 45. Further, a ridge line S is formed on a boundary portion between the inclined wall 45 and the general surface 24A.

These ridge lines P, Q, R, S are sometimes referred as a so-called character line. Generally, on a design surface of a vehicle, even curved surfaces each having a different curvature are formed to be continuous to each other to form a smooth curved surface (so-called general surface). Contrary to this, the character line is provided by forming an angular portion to divide this smooth curved surface. In the present embodiment, the ridge line P will be described as a character line 46.

On the other hand, an angular portion is formed on the door inner panel 22 corresponding to the angular portion formed on the design surface of the door outer panel 24. More specifically, as shown in FIG. 2A, the pedestal 34 and the license plate mounting portion 38 are formed on the door outer panel 24. Thus, projecting portions 48, 50 which project backward of the vehicle are provided to oppose the pedestal 34 and the license plate mounting portion 38 in the vehicle front-rear direction on the door inner panel 22. Adhesive 30A is provided on top face portions 48A, 50A of these projecting portions 48, 50. On the other hand, the door outer panel 24 is curved toward the front side in the vehicle front-rear direction as it goes outward in the vehicle width direction from the central portion in the vehicle width direction. Thus, as shown in FIG. 2B, the door outer panel 24 and the door inner panel 22 are in the proximity of each other via the ridge line P. Thus, the door inner panel 22 is provided with no shape equivalent to the projecting portions 48, 50 (see FIG. 2A) which bring the door inner panel 22 into proximity of the door outer panel 24 side.

Figure 3:
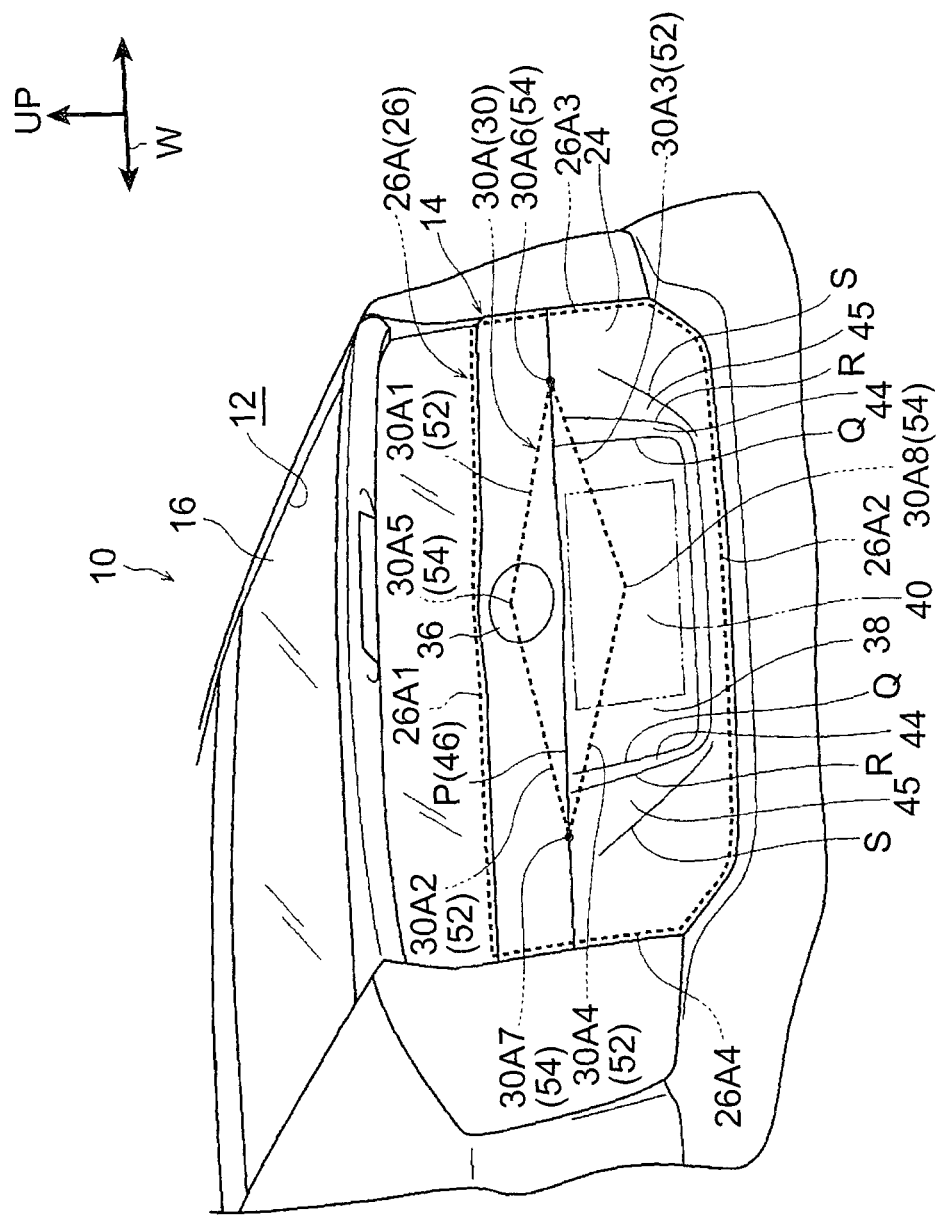
FIG. 3 is a major portion enlarged view showing a major portion in FIG. 1 in enlargement.

As described above, the door outer panel 24 is formed in a substantially rectangular shape and the adhesive 26A for the outside bonding portion 26 is provided along the outer edge portion of the door outer panel 24. Thus, as shown in FIG. 3, the outside bonding portion 26 is formed in a substantially rectangular shape and includes an upper side portion 26A1, a lower side portion 26A2, a right side portion 26A3, and a left side portion 26A4. The upper side portion 26A1 and the lower side portion 26A2 are formed along the vehicle width direction and the right side portion 26A3 and the left side portion 26A4 are formed along the vehicle up-down direction.

On the other hand, the inside bonding portion 30 is formed in a substantially diamond shape in the vehicle rear view and includes an upper right oblique side portion 30A1, an upper left oblique side portion 30A2, a lower right oblique side portion 30A3 and a lower left oblique side portion 30A4 as each bonding line 52. The upper right oblique side portion 30A1 and the upper left oblique side portion 30A2 are provided each along a direction intersecting with the upper side portion 26A1 of the outside bonding portion 26 in a plane direction of the door outer panel 24. Further, the lower right oblique side portion 30A3 and the lower left oblique side portion 30A4 are provided each along a direction intersecting with the lower side portion 26A2 of the outside bonding portion 26 in the plane direction of the door outer panel 24.

More specifically, the upper right oblique side portion 30A1 and the upper left oblique side portion 30A2 are inclined each downward in the vehicle up-down direction as they go outward in the vehicle width direction. Further, the lower right oblique side portion 30A3 and the lower left oblique side portion 30A4 are inclined upward in the vehicle up-down direction as they go outward in the vehicle width direction.

The upper right oblique side portion 30A1 and the upper left oblique side portion 30A2 are connected to each other via an upper apex (second apex) 30A5 which serves as a connecting portion 54. Further, the upper right oblique side portion 30A1 and the lower right oblique side portion 30A3 are connected to each other via a right apex 30A6 which serves as the connecting portion 54. Further, the upper left oblique side portion 30A2 and the lower left oblique side portion 30A4 are connected to each other via a left apex 30A7 which serves as the connecting portion 54. Further, the lower right oblique side portion 30A3 and the lower left oblique side portion 30A4 are connected to each other via a lower apex (first apex) 30A8 which serves as the connecting portion 54.

Here, in the inside bonding portion 30, the upper apex 30A5 is arranged at a position nearest the upper side portion 26A1 of the outside bonding portion 26 and the lower apex 30A8 is arranged at a position nearest the lower side portion 26A2 of the outside bonding portion 26. Further, the right apex 30A6 is arranged at a position nearest the right side portion 26A3 of the outside bonding portion 26 and the left apex 30A7 is arranged at a position nearest the left side portion 26A4 of the outside bonding portion 26. That is, in the inside bonding portion 30, each connecting portion 54 is arranged at a position nearest the outside bonding portion 26.

Then, the upper apex 30A5 and the lower apex 30A8 are arranged substantially in the center of the door outer panel 24 in the vehicle width direction and the upper apex 30A5 is set so as to overlap an emblem 36 in the vehicle rear view (when viewed from outside of the vehicle). On the other hand, the lower apex 30A8 is set so as to overlap the license plate 40 in the vehicle rear view. Further, the right apex 30A6 and the left apex 30A7 are set so as to overlap the character line 46 (ridge line P) in the vehicle rear view.

(Operation and Effect of the Bonding Structure of Vehicle Members)

As described above, according to the present embodiment, the door inner panel 22 of the back door 14 shown in FIG. 2A is formed of fiber-reinforced resin and the door outer panel 24 is formed of a resin material having a larger thermal expansion coefficient than the fiber-reinforced resin. Then, the door outer panel 24 and the door inner panel 22 are bonded to each other via the adhesive 26A on the outside bonding portion 26 and the adhesive 30A on the inside bonding portion 30.

Figure 9:
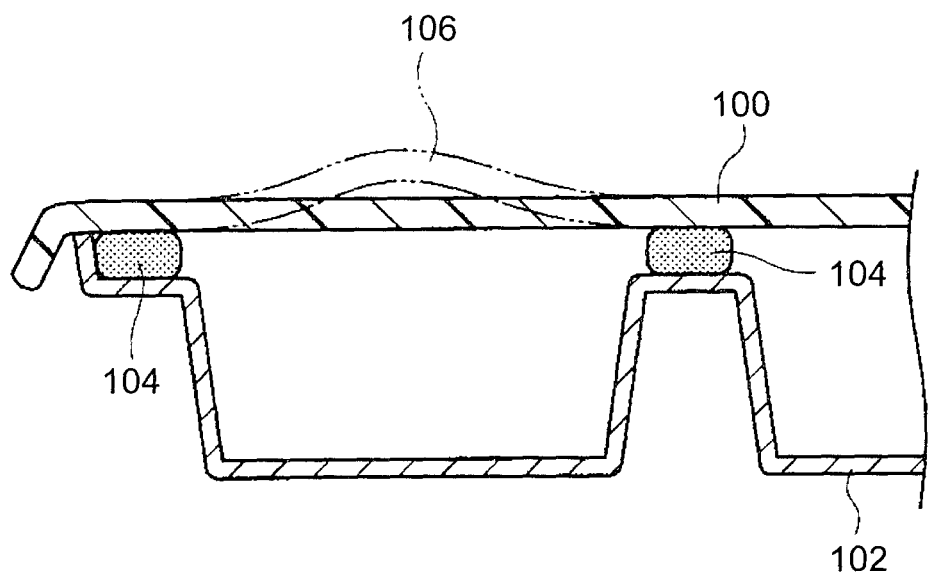
FIG. 9 is a sectional view showing a comparative example.

Generally, when panel members each having a different thermal expansion coefficient are bonded to each other, as shown in FIG. 9, a difference in thermal expansion is generated between a panel member 100 having a larger thermal expansion coefficient and a panel member 102 having a smaller thermal expansion coefficient under high temperatures. Because the panel member 100 and the panel member 102 are bonded (fixed) with the adhesive 104, movement of the panel member 100 is limited. As a result, a deformed portion 106 due to thermal strain is generated in the panel member 100 as indicated with a phantom line.

Thus, in the present embodiment, as shown in FIG. 3, the inside bonding portion 30 provided inside the substantially rectangular outside bonding portion 26 has a substantially diamond shape in the vehicle rear view. This inside bonding portion 30 includes a plurality of the bonding lines 52 (upper right oblique side portion 30A1, upper left oblique side portion 30A2, lower right oblique side portion 30A3 and lower left oblique side portion 30A4). Then, end portions of the bonding lines 52 in the proximity of each other are connected to each other by the connecting portion 54 (upper apex 30A5, lower apex 30A8, right apex 30A6, left apex 30A7) and the connecting portions 54 are arranged at positions nearest the outside bonding portion 26. Further, at least part of this connecting portions 54 are set to overlap the character line 46 formed on the general surface 24A of the door outer panel 24 when viewed from outside of the vehicle.

Generally, on the design surface of the vehicle, even curved surfaces each having a different curvature are formed so that they are continuous to each other to form a smooth curved surface (so-called general surface). The angular portion (so-called character line and the like) formed to divide such a smooth curved surface has a higher stiffness than the general portion (portion where the general surface is formed).

Thus, in the present embodiment, by forming the character line 46 with the angular portion on the door outer panel 24, stiffness of the door outer panel 24 itself can be improved. Consequently, the thermal strain in the door outer panel 24 can be inhibited. As a result, even in the door inner panel 22 (see FIG. 2A) and the door outer panel 24 each made of a material having a different thermal expansion coefficient, the thermal strain can be inhibited.

On the other hand, at the connecting portion 54 in the proximity of the outside bonding portion 26 in the inside bonding portion 30, thermal strains in different directions are compounded so that any deformed portion due to the thermal strain is more noticeable than other portions. Thus, by setting the connecting portion 54 to overlap the character line 46 formed on the door outer panel 24 when viewed from outside of the vehicle, the deformed portion due to the thermal strain can be made unnoticeable.

Further, in the present embodiment, the inside bonding portion 30 is formed in a substantially diamond shape in the vehicle rear view. By connecting the connecting portions 54 to each other with the linear bonding line 52 as described above, bonding strength between the door inner panel 22 and the door outer panel 24 can be improved compared to a case where the inside bonding portion is formed intermittently with a plurality of the bonding portions although not shown. In the meantime, needless to say, the inside bonding portion may be formed intermittently with a plurality of the bonding portions.

Further, at the connecting portion 54 which connects the bonding lines 52 to each other, the thermal strain on individual bonding lines 52 are compounded, so that the deformed portion due to the thermal strain is more noticeable than other portions. Thus, in the present embodiment, by setting the connecting portion 54 to overlap the character line 46 when viewed from outside of the vehicle as described above, the deformed portion due to the thermal strain can be made unnoticeable.

By the way, for example, if the outside bonding portion 108 and the inside bonding portion 110 are arranged in parallel to each other in the plane direction of the door outer panel 112, as shown in FIG. 10, the deformed portions 114 due to the thermal strain are formed continuously by a substantially equivalent strain amount along the outside bonding portion 108 and the inside bonding portion 110 between the outside bonding portion 108 and the inside bonding portion 110. Thus, the deformed portion due to the thermal strain is noticeable.

To the contrary, in the present embodiment, the upper right oblique side portion 30A1 and the upper left oblique side portion 30A2 of the inside bonding portion 30 are provided each along a direction intersecting with the upper side portion 26A1 of the outside bonding portion 26. Further, the lower right oblique side portion 30A3 and the lower left oblique side portion 30A4 of the inside bonding portion 30 are provided each along a direction crossing the lower side portion 26A2 of the outside bonding portion 26. That is, the respective bonding lines 52 which constitute the inside bonding portion 30 are set not to be formed in parallel to the outside bonding portion 26.

As a result, if a sectional position when cutting out the door outer panel 24 in a direction perpendicular to the outside bonding portion 26 is changed, a distance between the outside bonding portion 26 and the inside bonding portion 30 differs. That is, the strain amount due to thermal strain generated between the outside bonding portion 26 and the inside bonding portion 30 can be changed depending on a sectional position of the door outer panel 24. Thus, the deformed portion due to the thermal strain can be made unnoticeable.

Further, by forming the inside bonding portion 30 along a direction intersecting with the outside bonding portion 26, a direction in which the thermal strain is generated can be dispersed into plural directions including the direction perpendicular to an inclination of the bonding line 52 on the inside bonding portion 30. As a result, the strain amount due to the thermal strain can be reduced.

By forming the inside bonding portion 30 in the substantially diamond shape, a range in which the thermal strain can be generated easily can be controlled compared to a case where the inside bonding portion is formed in a complicated shape. Thus, by overlapping the deformed portion due to the thermal strain with the character line 46 in the vehicle rear view, the deformed portion can be made unnoticeable.

Further, in the present embodiment, the connecting portion 54 (upper apex 30A5) is overlapped with the emblem 36 and the connecting portion 54 (lower apex 30A8) is overlapped with the license plate 40, in the vehicle rear view. As a result, the deformed portion due to the thermal strain can be hidden at the connecting portions 54 excluding the right apex 30A6 and the left apex 30A7 (upper apex 30A5, lower apex 30A8).

Further, in the present embodiment, a material having a linear expansion coefficient of $0.5 \times 10^{-5}$ m/° C. is used for the door inner panel 22 and a material having a liner expansion coefficient of $6.0 \times 10^{-5}$ m/° C. is used for the door outer panel 24. Generally, a plurality of the character lines 46 are formed on the back door 14. Thus, if the thicknesses and the shapes of the door outer panel 24 and the door inner panel 22 are equal respectively, a difference in thermal expansion amount is 12 times. Even in this case, the thermal strain generated between the door outer panel 24 and the door inner panel 22 can be made unnoticeable. Because the problem which the present invention intends to solve can be generated when the linear expansion coefficient is twice or more although it depends on the thickness and shape, an effect of the present invention can be obtained by applying the present embodiment. Particularly, if the linear expansion coefficient exceeds five times, the effect of the present invention can be obtained more effectively.

Other Embodiments

In the present embodiment, as shown in FIG. 3, the shape of the inside bonding portion 30 is a substantially diamond shape constituted of the linear bonding lines 52. However, the present invention is not limited to this example at least if the connecting portion 54 for connecting the respective bonding lines 52 is set to overlap the character line 46 in the vehicle rear view.

Figure 4:
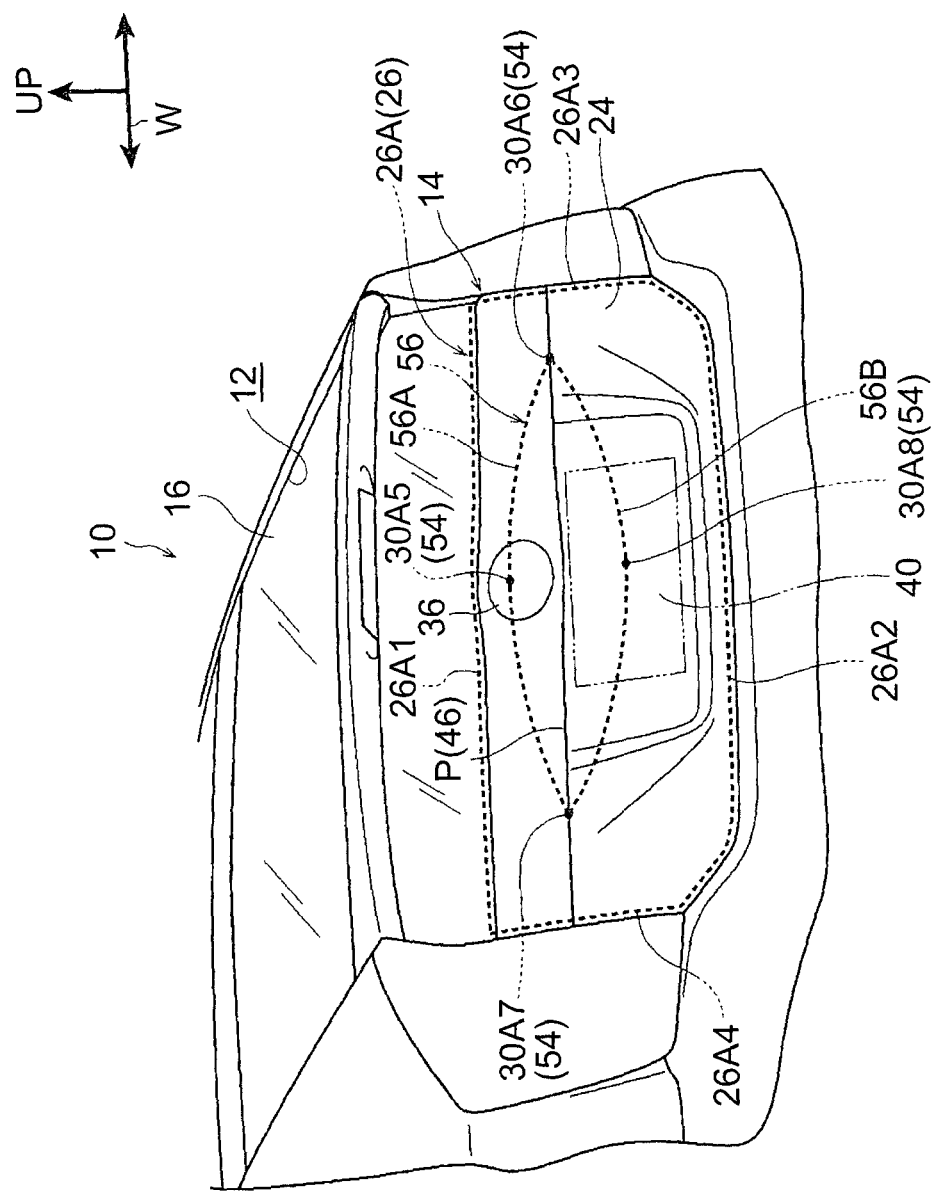
FIG. 4 is a major portion enlarged view corresponding to FIG. 3 showing a first modification of the bonding structure of vehicle members according to the present embodiment.

For example, as shown in FIG. 4, the inside bonding portion 56 may be constituted of a curved line 56A as a first curved line and a curved line 56B as a second curved line. The curved line 56A and the curved line 56B are formed such that they are expanded in a direction away from each other. The curved line 56A is formed by connecting the right apex 30A6, the upper apex 30A5 and the left apex 30A7 into a single curved line and the curved line 56B is formed by connecting the right apex 30A6, the lower apex 30A8 and the left apex 30A7 into a single curved line.

By constituting the inside bonding portion 56 with the curved line 56A and the curved line 56B as described above, the length of the bonding portion can be increased compared to a case where the inside bonding portion 30 is formed by connecting linear lines. As a result, the bonding strength between the door inner panel 22 and the door outer panel 24 can be improved.

In the inside bonding portion 56 shown in FIG. 4, the right apex 30A6, the upper apex 30A5 and the left apex 30A7 are connected with the single curved line 56A as the first curved line and the right apex 30A6, the lower apex 30A8 and the left apex 30A7 are connected with the single curved line 56B as the second curved line. However, the three apexes do not always have to be connected with a single curved line.

Figure 5:
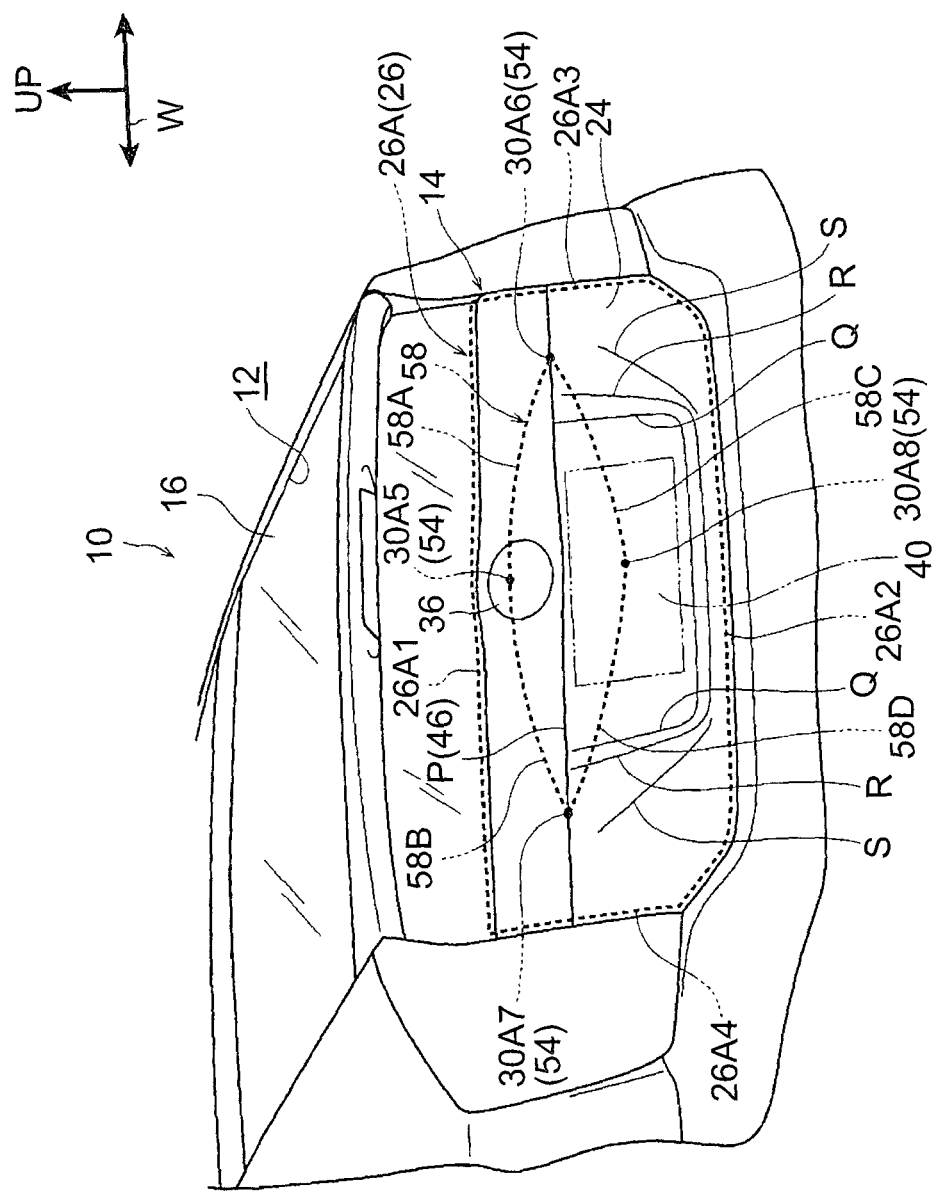
FIG. 5 is a major portion enlarged view corresponding to FIG. 3 showing a second modification of the bonding structure of vehicle members according to the present embodiment.

For example, as shown in FIG. 5, the inside bonding portion 58 may be constituted of a curved line 58A which connects the right apex 30A6 with the upper apex 30A5, a curved line 58B which connects the upper apex 30A5 with the left apex 30A7, a curved line 58C which connects the right apex 30A6 with the lower apex 30A8 and a curved line 58D which connects the lower apex 30A8 with the left apex 30A7. In the meantime, the curved line 58A, the curved line 58B, the curved line 58C and the curved line 58D are formed such that each of them is expanded in a direction of approaching the outside bonding portion 26 side.

Figure 6:
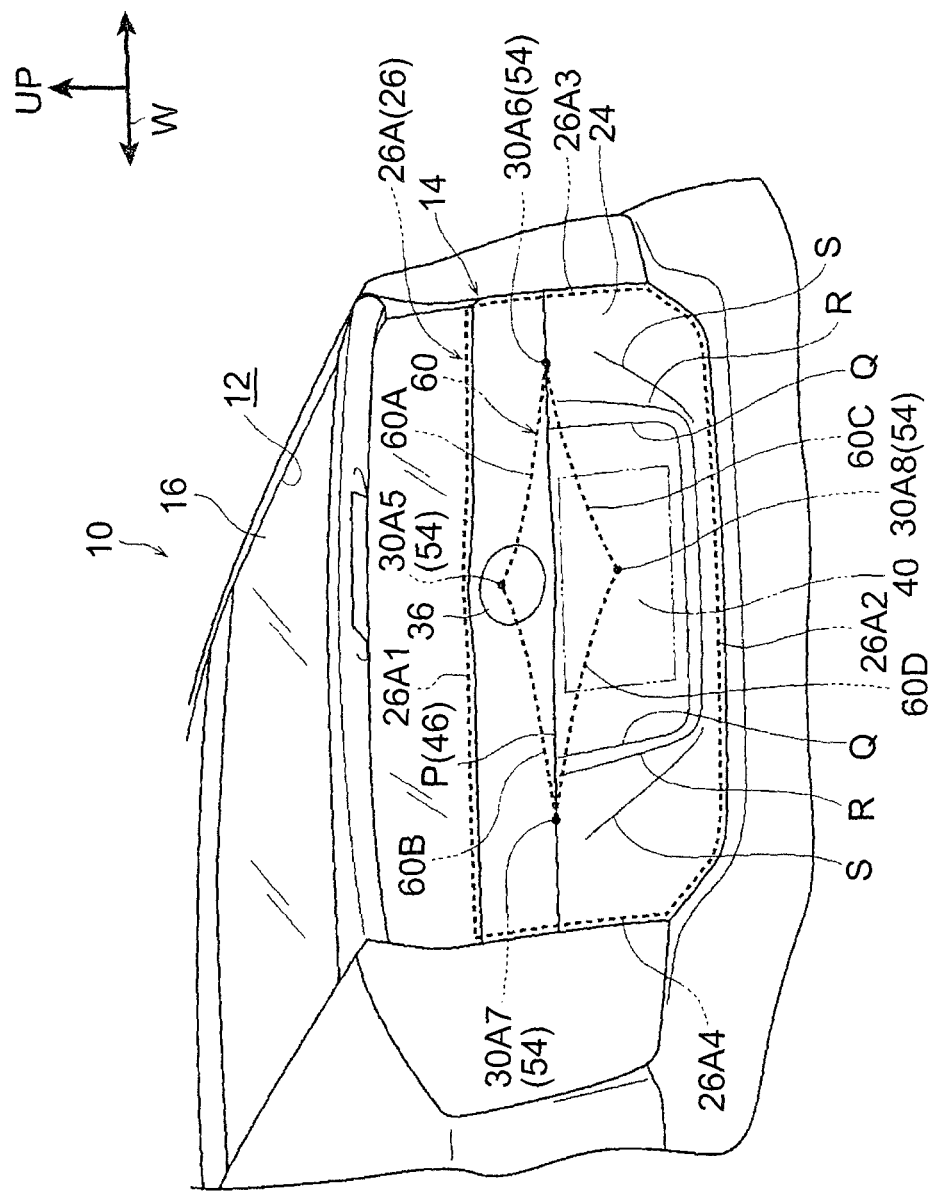
FIG. 6 is a major portion enlarged view corresponding to FIG. 3 showing a third modification of the bonding structure of vehicle members according to the present embodiment.

In the inside bonding portion 58 shown in FIG. 5, the curved line 58A, the curved line 58B, the curved line 58C and the curved line 58D are formed such that each of them is expanded in a direction of approaching the outside bonding portion 26 side. However, as shown in FIG. 6, a curved line 60A, a curved line 60B, a curved line 60C and a curved line 60D which constitute an inside bonding portion 60 may be formed such that each of them is recessed in a direction away from the outside bonding portion 26. In the respective curved lines 60A, 60B, 60C and 60D, their strain amounts due to the thermal strain can be reduced because the distance from the outside bonding portion 26 increases.

Figure 7:
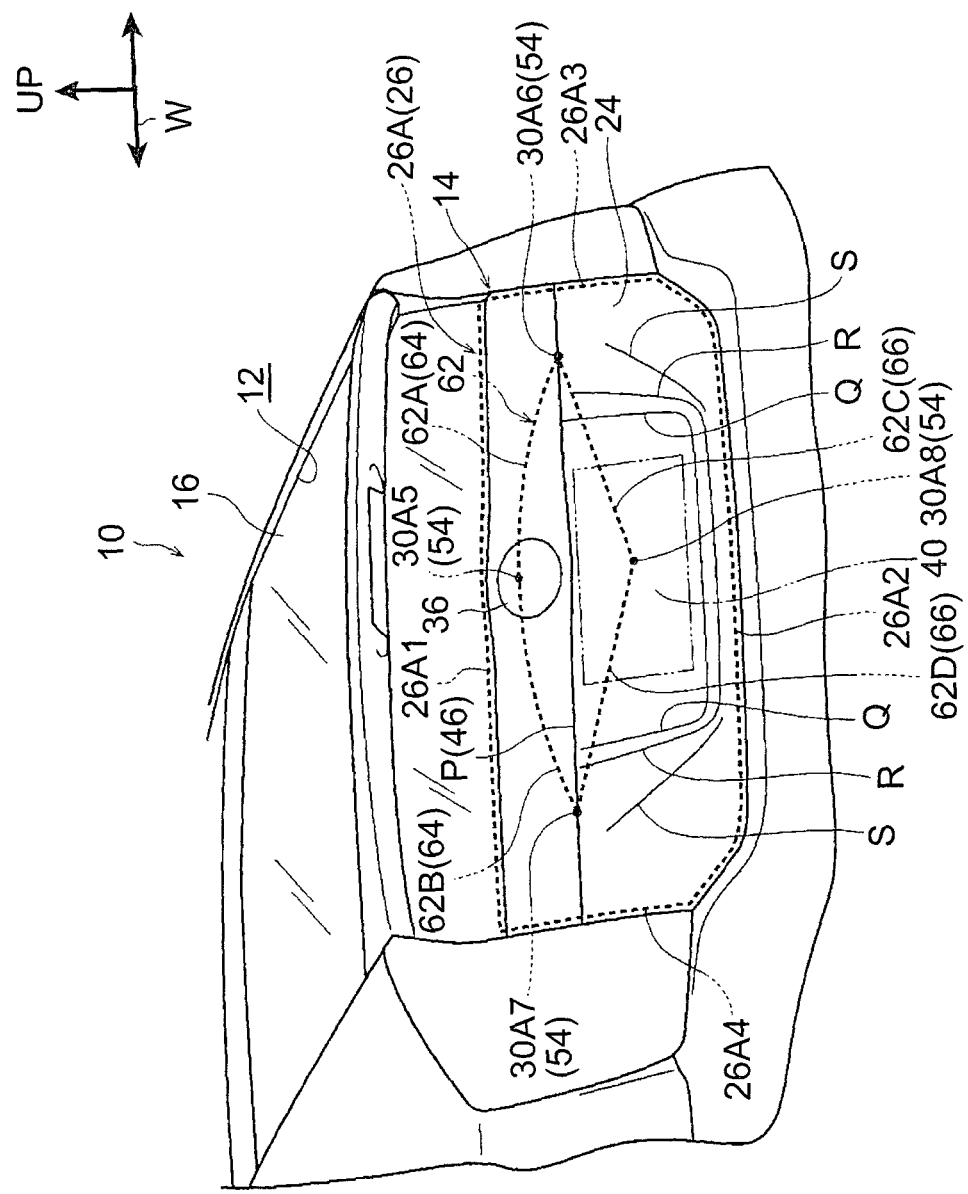
FIG. 7 is a major portion enlarged view corresponding to FIG. 3 showing a fourth modification of the bonding structure of vehicle members according to the present embodiment.

Although in the above-described respective embodiments, the bonding line which constitutes part of the inside bonding portion is formed with only linear lines or curved lines, the present invention is not limited to this example. For example, the bonding line of the inside bonding portion may be constituted of the curved line and the linear line. As an example, as shown in FIG. 7, in the inside bonding portion 62, the right apex 30A6 and the upper apex 30A5 are connected with a curved line 62A expanded in a direction of approaching the outside bonding portion 26 side, and the upper apex 30A5 and the left apex 30A7 are connected with a curved line 62B expanded in a direction of approaching the outside bonding portion 26 side. Then, the right apex 30A6 and the lower apex 30A8 are connected with a linear line 62C and the lower apex 30A8 and the left apex 30A7 are connected with a linear line 62D. By connecting the curved bonding line 64 with the linear bonding line 66 in this way, freedom in the shape of the inside bonding portion 62 is increased.

By changing the shape of the inside bonding portion as described above, the position of the connecting portion 54 which overlaps the character line 46 in the vehicle rear view can be changed appropriately. Further, the inside bonding portion does not always have to be constituted with the linear or curved bonding line but at least part thereof may be formed intermittently.

Figure 8:
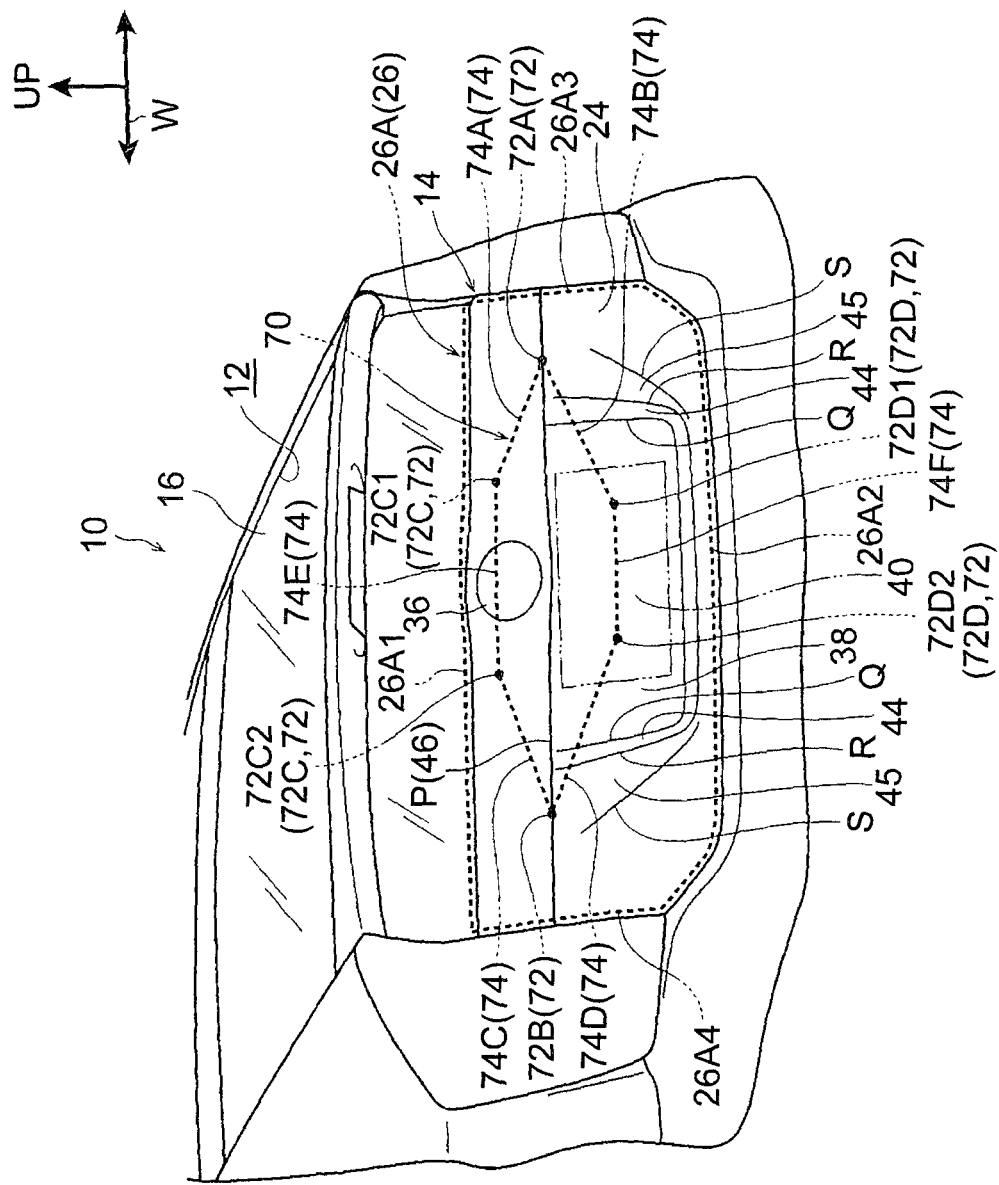
FIG. 8 is a major portion enlarged view corresponding to FIG. 3 showing a fifth modification of the bonding structure of vehicle members according to the present embodiment.

Further, the number of the connecting portions 54 is not limited to four and may be changed appropriately depending on the shape of the inside bonding portion. For example, if the inside bonding portion is formed in a hexagonal shape as shown in FIG. 8, it comes that six connecting portions 72 are provided.

More specifically, like the above-described respective embodiments, a right apex 72A and a left apex 72B are set to overlap the character line 46 (ridge line P) in the vehicle rear view. On the other hand, as for upper apexes 72C, an upper right apex 72C1 and an upper left apex 72C2 are provided on the right and left with the emblem 36 located therebetween in the vehicle width direction in the vehicle rear view. Further, as for lower apexes 72D, a lower right apex 72D1 and a lower left apex 72D2 are provided on the right and left at positions where they overlap the license plate 40 in the vehicle width direction in the vehicle width view.

Then, as for a bonding line 74 which constitutes an inside bonding portion 70, a linear upper right oblique side portion 74A which connects the right apex 72A with the upper right apex 72C1 is provided and a linear lower right oblique side portion 74B which connects the right apex 72A with the lower right apex 72D1 is provided. Further, a linear upper left oblique side portion 74C which connects the left apex 72B with the upper left apex 72C2 is provided and a linear lower left oblique side portion 74D which connects the left apex 72B with the lower left apex 72D2 is provided. Further, an upper side portion 74E which connects the upper right apex 72C1 with the upper left apex 72C2 is provided and a lower side portion 74F which connects the lower right apex 72D1 with the lower left apex 72D2 is provided.

Here, the upper side portion 74E is formed substantially in parallel to the upper side portion 26A1 of the outside bonding portion 26 and the lower side portion 74F is formed substantially in parallel to the lower side portion 26A2 of the outside bonding portion 26. Because the lower side portion 74F is formed at a position where it overlaps the license plate 40 in the vehicle rear view, the deformed portion due to the thermal strain is hidden.

On the other hand, because the upper side portion 74E is in the proximity of the upper side portion 26A1 of the outside bonding portion 26 while overlapping the emblem 36 in the vehicle rear view, the deformation amount due to thermal strain is so small that it is unnoticeable. Thus, in the upper side portion 74E and the lower side portion 74F, the deformed portion due to thermal strain is not always noticeable even if they are formed in parallel to the outside bonding portion 26.

In the meantime, although the upper right oblique side portion 74A, the lower right oblique side portion 74B, the upper left oblique side portion 74C, the lower left oblique side portion 74D, the upper side portion 74E, and the lower side portion 74F have been described as a linear bonding line here, these bonding lines do not always have to be formed linearly. They may be formed at least partially in a curved line.

Although in the present embodiment, the ridge line P has been described as the character line 46, the ridge lines Q, R, S also can constitute the character line 46. If the inside bonding portion 70 forms the bonding line 74 corresponding to the ridge lines Q, R, S, the deformed portion due to thermal strain can be made unnoticeable.

That is, when thermal strain is generated on the door outer panel 24, the thermal strain is generated between the outside bonding portion 26 and the inside bonding portion 70. Thus, the character line 46 is arranged between the outside bonding portion 26 and the inside bonding portion 70 when viewed from outside of the vehicle and further, the inside bonding portion 70 is formed along the character line 46. As a result, the deformed portion due to thermal strain can be made unnoticeable.

Further, in the present embodiment, it has been described that fiber-reinforced resin is used as a material for the door inner panel 22 shown in FIG. 2A and that the TSOP is used as the material for the door outer panel 24, as an example of the present invention. However, the present invention is not limited to this example if the door inner panel 22 is formed of a material having a smaller thermal expansion coefficient than the door outer panel 24. Further, it is permissible to use a metallic material such as steel sheet and aluminum alloy as the material for the door inner panel 22.

Further, although in the present embodiment, it has been described that the bonding structure of vehicle members has been applied to the back door 14 shown in FIG. 1 as an example, the bonding structure can be applied to a roof panel 78, a side door 80 and an engine hood (not shown) as well as the back door 14.

Although the embodiments of the present invention have been described above, the present invention is not limited to the above-described ones but needless to say, the present invention can be carried out in a variety of modifications other than described above within a range not departing from the spirit of the invention.

What is claimed is:

1. A bonding structure of vehicle members comprising:
a first member which is formed of a first material, comprising a first resin, the first member being in a shape of a panel and in which a ridge line is formed by an angular portion dividing first and second portions of a surface of the first member such that a curvature of the first portion is formed to be discontinuous with respect to a curvature of the second portion of the surface;
a second member which is formed in a shape of a panel of a second material, comprising a second resin or metal, such that the second member has a smaller thermal expansion coefficient than the first member, wherein the second resin is different than the first resin;
an outside bonding portion which is provided on an outer edge side of the first member so as to bond the first member and the second member to each other; and
an inside bonding portion which is provided inside of the outside bonding portion in a plane direction of the first member and bonds the first member and the second member to each other, the inside bonding portion including a plurality of apexes where at least one of the plurality of apexes in a proximity of the outside bonding portion overlaps the ridge line when viewed from outside of the vehicle.

2. The bonding structure of vehicle members according to claim 1, wherein
the inside bonding portion includes a plurality of linear or curved bonding lines and
the apex is a connecting portion for connecting the bonding lines to each other.

3. The bonding structure of vehicle members according to claim 2, wherein
the bonding lines are provided in a direction intersecting with the outside bonding portion in the plane direction of the first member.

4. The bonding structure of vehicle members according to claim 2, wherein
the ridge line is provided between the outside bonding portion and the inside bonding portion when viewed from outside of the vehicle and the inside bonding portion is formed along the ridge line.

5. The bonding structure of vehicle members according to claim 2, wherein
the inside bonding portion has a polygonal shape.

6. The bonding structure of vehicle members according to claim 2, wherein
the bonding lines constitute first curved lines, and the first curved lines are formed such that the first curved lines are recessed in a direction away from the outside bonding portion.

7. The bonding structure of vehicle members according to claim 2, wherein
the bonding lines constitute second curved lines, and the second curved lines are formed such that the second curved lines extend in a direction toward the outside bonding portion.

8. The bonding structure of vehicle members according to claim 2, wherein the inside bonding portion is formed such that end portions of a first curved line which is expanded to the outside bonding portion side and a second curved line which is expanded in a direction away from the first curved line are connected to each other via the connecting portion.

9. The bonding structure of vehicle members according to claim 1, wherein
a first apex of the plurality of apexes is provided at a position where the first apex overlaps a license plate when viewed from outside of the vehicle.

10. The bonding structure of vehicle members according to claim 1, wherein
a second apex of the plurality of apexes is provided at a position where the second apex overlaps an emblem when viewed from outside of the vehicle.

11. A bonding structure of a back door comprising:
a door outer panel which constitutes an outer panel of a back door;
a door inner panel which is arranged on a vehicle compartment side of the door outer panel and constitutes an inner panel of the back door;
an outside bonding portion which is provided on an outer edge side of the door outer panel so as to bond the door outer panel and the door inner panel to each other; and
an inside bonding portion which is provided inside of the outside bonding portion in a plane direction of the door outer panel and bonds the door outer panel and the door inner panel to each other, the inside bonding portion including a plurality of apexes where at least one of the plurality of apexes in a proximity of the outside bonding portion overlaps a ridge line when viewed from outside of the vehicle;
wherein
the door outer panel is formed of a first material, comprising a first resin the door outer panel being in a shape of a panel and in which the ridge line is formed by an angular portion dividing first and second portions of a surface of the door outer panel such that a curvature of the first portion is formed to be discontinuous with respect to a curvature of the second portion of the surface, and
the door inner panel is formed in a shape of a panel of a second material, comprising a second resin or metal such that the door inner panel has a smaller thermal expansion coefficient than the door outer panel, wherein the second resin is different than the first resin.

* * * * *